(12) United States Patent
Tal (10) Patent No.: US 7,300,065 B2
(45) Date of Patent: Nov. 27, 2007

(54) BODY WEIGHT-ACTIVATED SCOOTER

(76) Inventor: Yair Tal, Yetziat Europa 30, Kfar Saba 44000 (IL)

( * ) Notice: Subject to any disclaimer, the term of this patent is extended or adjusted under 35 U.S.C. 154(b) by 0 days.

(21) Appl. No.: 11/563,217

(22) Filed: Nov. 27, 2006

(65) Prior Publication Data

US 2007/0114749 A1    May 24, 2007

Related U.S. Application Data

(63) Continuation-in-part of application No. 11/108,075, filed on Apr. 18, 2005, now abandoned.

(51) Int. Cl.
    *A63B 71/00*    (2006.01)
(52) U.S. Cl. ...................... 280/221; 280/255
(58) Field of Classification Search ............... 280/221, 280/253, 254, 255
    See application file for complete search history.

(56) References Cited

U.S. PATENT DOCUMENTS

| 1,272,761 | A | * | 7/1918 | Bailey ......................... 280/221 |
| 1,653,889 | A | * | 12/1927 | Clark .......................... 280/221 |
| 3,285,618 | A | * | 11/1966 | Welch .................... 280/11.115 |
| 4,124,222 | A | * | 11/1978 | Moe et al. ................... 280/221 |
| 4,379,566 | A | * | 4/1983 | Titcomb ..................... 280/251 |
| 4,828,284 | A | * | 5/1989 | Sandgren .................... 280/221 |
| 5,335,927 | A | * | 8/1994 | Islas ........................... 280/255 |
| 5,368,321 | A | * | 11/1994 | Berman et al. ............. 280/221 |
| 5,492,345 | A | * | 2/1996 | Kruczek ................ 280/11.115 |
| 6,402,173 | B1 | * | 6/2002 | Chiu .......................... 280/252 |
| 6,716,141 | B2 | * | 4/2004 | Bhoopathy ................... 482/51 |

* cited by examiner

*Primary Examiner*—Kevin Hurley
(74) *Attorney, Agent, or Firm*—Edward Langer; Shiboleth, Yisraeli, Roberts, Zisman & Co.

(57) ABSTRACT

A body weight-activated scooter having a rear, vertical chassis section and at least one front steering wheel mounted on a front chassis section and at least one rear drive-wheel, the scooter provided with a pair of systems substantially in alignment with a vertical gravity line for transferring power to at least one rear drive-wheel, each of the pair of systems comprising: a treadle bearing most of the weight of a rider at a heelward end; a weight-vector wheel; a return tension means; and an over-running clutch drive connected to the at least one rear drive-wheel and linked to the weight-vector wheel via a linking means, the over-running clutch drive providing sustained forward thrust when the treadle is depressed by the weight of a rider on the heelward end and the scooter is operated.

17 Claims, 5 Drawing Sheets

BODY WEIGHT-ACTIVATED SCOOTER

CROSS-REFERENCE TO RELATED APPLICATION

The present application is a Continuation-in-Part of U.S. patent application Ser. No. 11/108,075 filed Apr. 18, 2005 by the Applicant now abandoned.

FIELD OF THE INVENTION

The present invention relates generally to scooters, and more particularly to a body weight-activated scooter utilizing over-running clutch drives in conjunction with weight-vector wheels for generating forward motion.

BACKGROUND OF THE INVENTION

The world population, especially in Western societies, resides more and more in flat, smooth places, either naturally so, or made so by urban construction (due to paving). Localities and areas that are not smooth and flat can be improved and developed into areas more suitable to the use of "wheeled feet" thus easing the task of using one's feet rather than expending time, energy, and money on using motorized transport. In many cases, urban centers are being closed to all but foot traffic to limit the "grid-lock" of vehicular congestion and the known effects of air and noise pollution. This has given rise to smaller and more agile means of individual, personal transport, such as bicycles and motorized scooters, and the like, which have become the norm in many cities world-wide, especially in large, urban centers.

Lightweight, relatively inexpensive, small-wheeled, foot-operated devices for individual transport, recreation, and sports activity—exclusive of pedaled vehicles, such as bicycles—generally include scooters, skateboards, roller skates, and roller blades which are generally used by young children and youth.

There are many prior-art variations on foot-operated wheeled vehicles of the type described herein, such as U.S. Pat. No. 4,828,284 to Sandgren, U.S. Pat. No. 4,124,222 to Moe, U.S. Pat. No. 1,653,889 to Clark, and U.S. Pat. No. 1,272,761 to Bailey.

In Sandgren there is described a twin-treadle, individual-use vehicle utilizing a chain linking means and chain sprocket mechanism much as in a conventional bicycle to generate forward motion in connection with an over-running clutch mounted on at least one rear drive wheel. Sandgren employs a lateral, cross-over arrangement for the linking means which impacts negatively on the efficiency of the vehicle as described and causes loss of power in the drive-train system.

In Moe there is described a single, pivoted treadle sport vehicle utilizing a rocking motion to generate continuous forward motion The treadle does not support both feet of a rider and a rider is required to use only one foot for operation of the vehicle. The rocking mechanism is a single lever connected at one end to a spring and at the other end pivotably connected to a connector attached to the treadle. The platform is non-symmetrical with respect to the pivot further impacting on power efficiency in one plane. This construction is problematic due to the possibility of uneven and perhaps undue stress on the connections of the lever from the foot pressure of the rider on the treadle.

In Clark there is described a lateral cross-over linkage drive train for a twin pedal vehicle provided with dual rear-drive wheels. The drive mechanism comprises sprocket wheels mechanically connected to the rear-drive wheels to engage a linking cord in a complicated system requiring the use of a horizontally disposed guide wheel in addition to a pair of pulleys to transfer the cable force generated by the foot action of a standing rider on the pairs of pedals which are hingedly attached to the forward portion of the frame.

In Bailey there is described a three-wheeled vehicle which also utilizes a lateral, cross-over linking system with its inherent power loss and inefficiency. The vehicle utilizes a pair of front steering wheels and has the further complication of a pulley system and an enclosed ratchet wheel provided with pawls to operate the twin pedal vehicle. These construction features add to the cost of manufacture and make the vehicle more expense for youth and senior citizens to purchase.

Thus there is a need for a relatively inexpensive, light-weight, yet sturdy-construction scooter which can comfortably support both feet of a rider, and which is activated by the use of body-weight force exerted in a single plane in line with gravity and thus optimizes foot pressure on a pair of treadles to operate the vehicle without putting a load on the chassis or other portions of the scooter, and thus provide a smooth ride without undue physical exertion on the part of the rider.

SUMMARY OF THE INVENTION

The present invention is based on a two-wheeled scooter having a rear, vertical section of its chassis aligned with a gravity line, having a pair of weight-vector wheels mounted in an upper portion of the rear, vertical chassis section; and whose lower portion is provided with a pair of over-running clutch drives between which is disposed at least one rear-drive wheel.

The scooter of the present invention includes a pair of systems disposed in the rear, vertical chassis section for transferring power to at least one rear-drive wheel. Although each system works in an independent path, they work in a single plane. Thus there is no power shift caused by side forces, and therefore neither a need to reinforce the chassis, nor any significant power loss to the system.

The scooter of the present invention, in a preferred embodiment thereof, bears most of the weight of a rider on the rear, vertical chassis section which is aligned with a vertical gravity line and therefore frees the rest of the structural parts of the scooter, such as the front axle, from any weight-bearing load. This construction and weight distribution shifts the major part of the weight of a person to the heelward portion of each of a pair of treadles which is substantially disposed at the rear, vertical section. On such a chassis there is almost only the pushing pressure from operation of the scooter and this allows it to be very light-weight in construction.

In another embodiment of the invention, each of the pair of treadles is supported by a corresponding reciprocating rods pivotably attached to connectors and extension rods which, in combination, provide for an additional, reciprocal, forward and rearward movement of the treadles when the scooter is operated.

The pair of treadles are each connected at their heelward ends to one end of each corresponding V-belt via stirrup-like springs supporting the heelward ends and introduced to reduce vibration. The other end of each of the V-belts is connected to each of a corresponding pair of longer, return springs which operate to reverse the direction of pull of the pair of V-belts and to maintain tension.

The pair of systems of the present invention works by a rider alternately lifting and depressing his feet on the pair of treadles, as desired. The operation is effected by direct placement of the heels of a rider, in a stepping action, at the extreme rear point on the pair of treadles in line with the gravity vector so as to maximize the weight vector on the pair of V-belts and to create forward thrust which is transferred to at least one rear drive wheel.

Accordingly, it is a principal object of the present invention to overcome the disadvantages of the prior art and to provide a body weight-activated scooter having a chassis with at least one front wheel for steering mounted on a front axle disposed in a forward chassis section, and at least one rear drive-wheel mounted on a rear axle disposed in a rear, vertical chassis section, the scooter being provided with a pair of systems substantially in alignment with a vertical gravity line for transferring power to at least one rear drive-wheel, each of the pair of systems comprising:

a treadle having a forward and heelward end bearing most of the weight of a rider at the heelward end, being pivotally attached at the forward end to the forward chassis section;

a weight-vector wheel mounted above and behind the heelward end;

a linking means having one end pivotally attached to the heelward end and being looped over the weight-vector wheel;

a return tension means attached at one end to the forward chassis section, and attached at its other end to the other end of the linking means; and an over-running clutch drive mounted on the rear axle and mechanically connected to the at least one rear drive-wheel and linked to the weight-vector wheel via the looped linking means, the overrunning clutch drive providing sustained forward thrust when the treadle is depressed by the weight of a rider on the heelward end and the scooter is operated.

The scooter of the present invention, in a preferred embodiment thereof, is operated by the weight of the body through small, controlled, foot movements, which, when applied to one of the pair of treadles, moves the scooter forward with sustained forward thrust. In effect, the scooter exploits the weight of the body while "stepping" in place to generate a forward motion. When a user pauses between "steps", the scooter coasts freely. To lengthen coasting motion, the user simply resumes the "stepping" action and it is not necessary to use a push with a free foot against the ground or surface to regain momentum as is done with a children's scooter. The scooter is especially suited for use on flat, paved areas, such as city streets, sidewalks, broad plazas, and shopping and recreational centers since it is not motorized.

In a preferred embodiment of the invention, one end of each of a pair of linking means, such as a V-belt or link-chain, is connected to the heel portion of one of a corresponding pair of treadles; the other end of each of the pair of linking means is connected via a pair of corresponding weight-vector wheels, to each of a corresponding pair of over-running clutch drives, which operates at least one rear drive wheel. For convenience, linking means is hereinafter referred to as V-belts, unless otherwise specified. The over-running clutch drives automatically engage with the V-belts in one direction, but freewheel in the other. A pair of return springs maintains the tension in the pair of V-belts and helps return them to their initial, respective starting positions.

An appropriate chassis, as lightweight as possible, is necessary to optimize the stepping action of a user to drive the scooter forward. In a preferred embodiment of the invention, the scooter is constructed of a relatively light-weight material, such as plastic, aluminum, leather, and the like. The key element of locomotion is the requirement that the pushing vector is optimized in relation to the gravitational vector. The power of the foot pressure is applied as close as possible to the pressure vector.

The scooter is intended for smooth, flat surfaces which will help people who have walking difficulties; only a small lifting of the heel of the foot is sufficient to create a driving "pulse". The device of the invention is relatively inexpensive and does not require a motor. It is therefore also quiet in operation and pollution-free to the environment.

Other features and advantages of the invention will become apparent from the following drawings and descriptions.

BRIEF DESCRIPTION OF THE DRAWINGS

For a better understanding of the invention in regard to the embodiments thereof, reference is made to the following drawings, not shown to scale, in which like numerals designate corresponding sections or objects throughout, and in which.

DETAILED DESCRIPTION OF THE INVENTION

Figure 1:
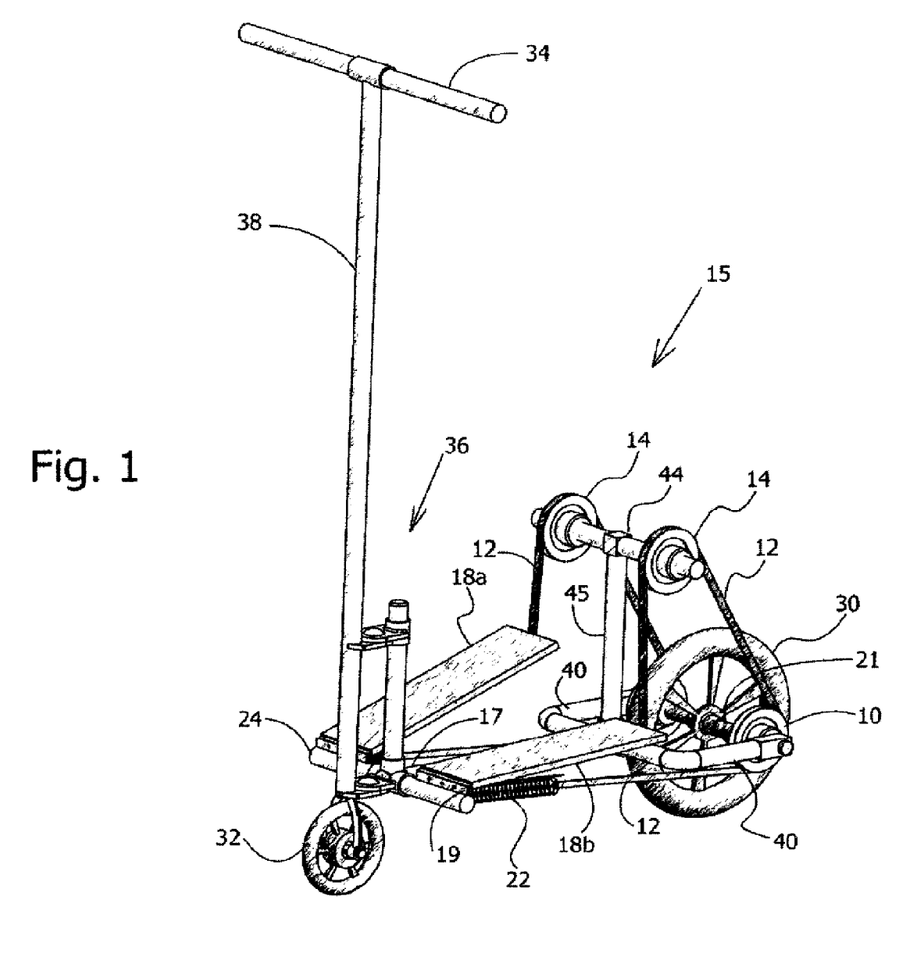
FIG. 1 is a general isometric view of a two-wheeled scooter constructed in accordance with a preferred embodiment of the invention.

FIG. 1 is a general isometric view of a two-wheeled scooter constructed in accordance with a preferred embodiment of the invention.

A two-wheeled scooter 15 comprises steering handlebars 34 mounted on an extendible upright, steering rod 38 rotatably connected to a steering mechanism 36 mechanically attached to the front portion of scooter 15. The height of handlebars 34 is set to accommodate the average height of a rider, but, optionally, may be constructed so as to be adjustable (not shown). A light-weight chassis 17 supports a pair of individually operated treadles 18a and 18b. Steering rod 38 controls the turning of front steering wheel 32. Although only one front steering wheel is shown, by way of example, it is obvious to those skilled in the art that more than one can be used to provide greater stability or improved turning characteristics.

Treadles 18a/b are pivotably attached at their respective front ends to hinges 19 mounted on lateral extensions 24 of chassis 17 so that their respective heelward portions are free to move up and down when activated by a rider. When the heel pressure of the foot of a rider is removed from treadles 18a/b, the heelward portions are drawn up by corresponding V-belts 12. This pair of V-belts 12 is attached at one point to the heelward portion of each treadle 18a/b. Each V-belt 12 is firmly looped around a respective vector wheel 14 mounted on an upper weight-vector wheel axle 44, set at a predetermined height above each of the pair of treadles 18*a/b* on a vertical supporting member 45 of chassis 17 to provide optimum vector force when either one of treadles 18*a/b* is depressed.

The upward path of each V-belt 12 from treadles 18*a/b* operates in the line of gravity in a substantially vertical path in respect to weight-vector wheels 14. The downward portion of each V-belt 12 transfers the pushing pressure of the heel of a rider to a pair of over-running clutch drives 10 mounted on the outward sides of rear drive wheel 30 and sharing a common axle 21. Note that a fork-like frame 40 of chassis 17 supports axle 21 and rear drive wheel 30 with the pair of over-running clutch drives 10.

The pair of V-belts 12 firmly loops around their respective over-running clutch drives 10 and are mechanically connected to a pair of tension means, such as return springs 22 which are anchored to corresponding points on the underside of cross-bars 24 of chassis 17. Return springs 22 serve to exert an upward counter-pressure to that of the weight pressure on treadles 18*a/b* to alternately reverse the direction of force along the respective V-belts 12.

The heelward ends of treadles 18*a/b* are initially both at rest on wheel frame 40 in the vertical, rear section of chassis 17 to allow a rider to mount scooter 15. The action of lifting first one and then the other of the heels of a rider in a stepping-like motion frees the tension on the corresponding return spring 22 and exerts a pulling force on the corresponding one of a pair of V-belts 12. V-belt 12 transfers this force, via a corresponding one of weight-vector wheel 14, to the heelward end of its respective treadle 18 which is lifted upward. When the rider next bears down with his heel on the uplifted treadle, the procedure is reversed: the respective treadle 18 is depressed at its heelward end, a corresponding V-belt 12 transfers the pressure via a corresponding weight-vector wheel 14 to a corresponding over-running clutch 10 attached to rear-drive wheel 30, and the scooter 15 is impelled forward.

Figure 2A:
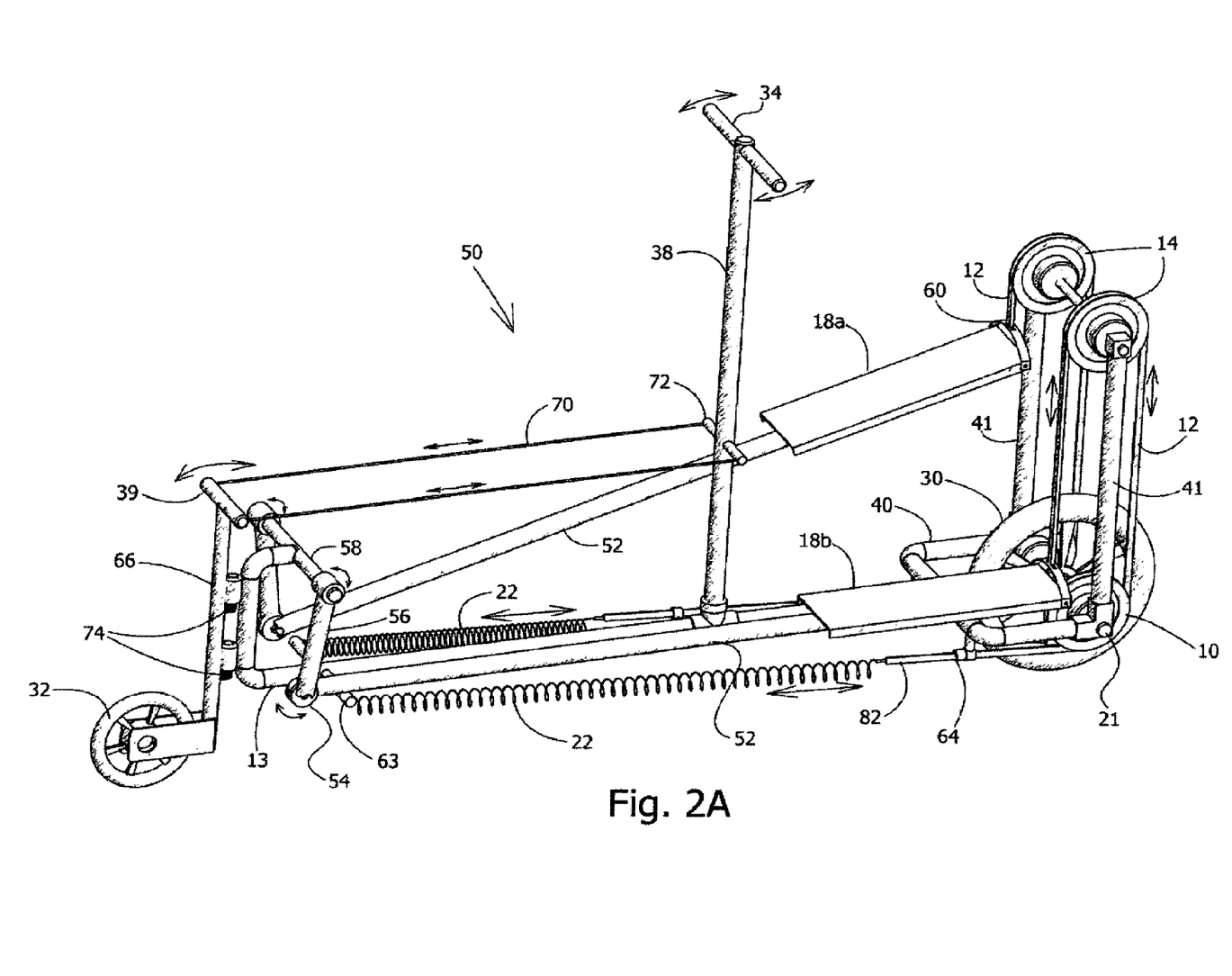
FIG. 2A is an isometric view of another embodiment of the invention.

FIG. 2A is an isometric view of another embodiment of the invention. There is shown a two-wheeled scooter 50 comprising a front steering wheel 32 and a rear-drive wheel 30 mounted on an elongated chassis 13. In this embodiment of the present invention, a pair of treadles 18*a* and 18*b* are each, individually supported on one of a corresponding pair of reciprocating rods 52. Since most of the stepping force of a rider is applied to the extreme rear end of each of the treadles 18*a/b*—which has more freedom of movement than the respective front ends—the rear ends of treadles 18*a/b* normally would form an arc while pivoting. Reciprocating rods 52 help to compensate for this, being pivotably attached at their respective forward ends to a corresponding pair of connectors 54 whose other ends are each pivotally attached to respective lower ends of a corresponding pair of extension arms 56. Extension arms 56, at their respective upper ends, are each rotatably fixed to a common cross-bar 58 which is mechanically connected to chassis 13 at a forward section of scooter 50.

Figure 3:
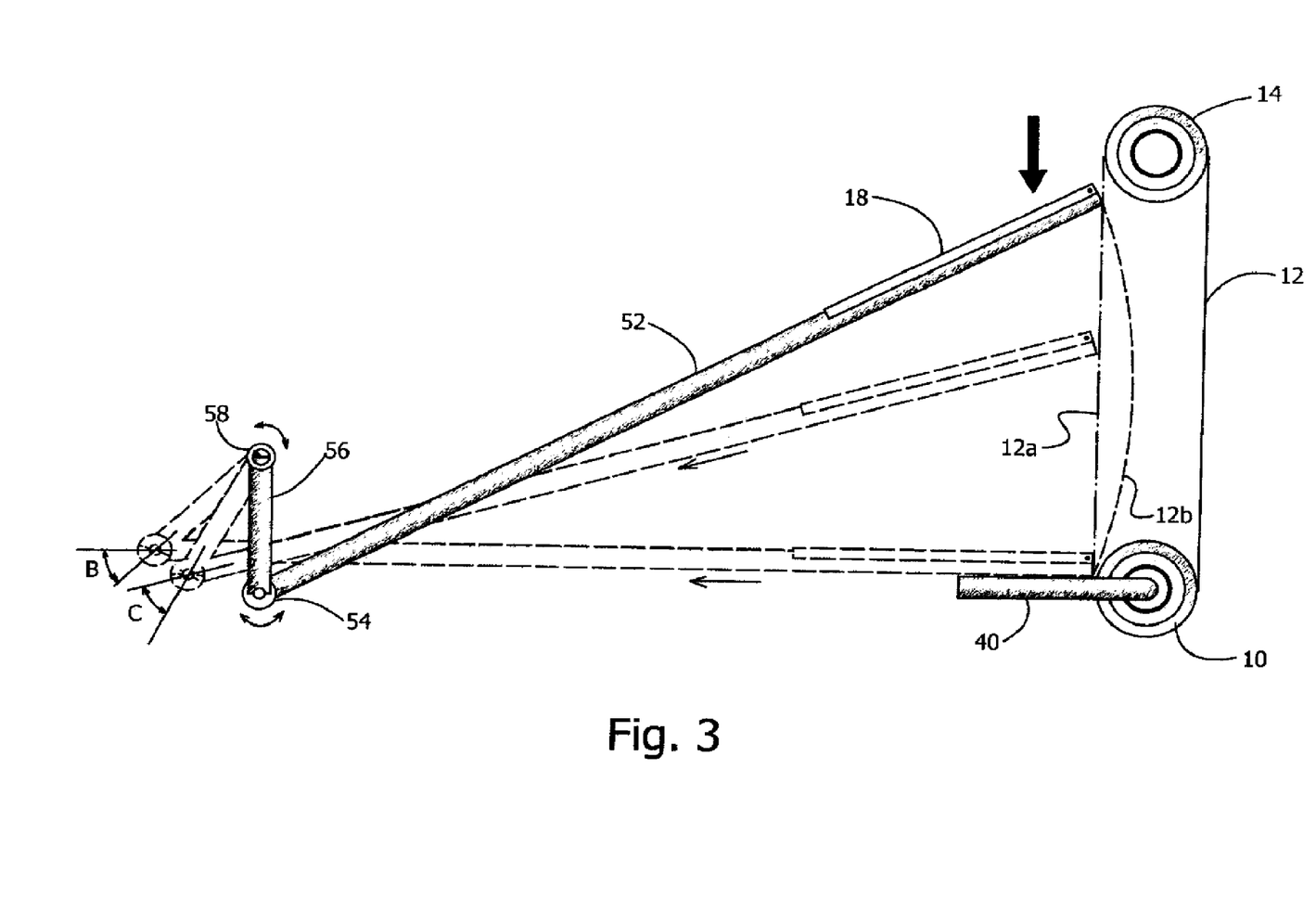
FIG. 3 is a schematic diagram showing the mechanics involved in the reciprocal motion of the treadles of the scooter from FIG. 2A in accordance with the principles of the present invention.

Reciprocating rods 52, connectors 54, and extension arms 56 operate cooperatively to provide a reciprocating movement to treadles 18*a/b* sufficient to correct the heelward path of each which, when in motion, might otherwise stray from the vertical and move in an arc (see FIG. 3). They maintain the alignment of the rearward portion of each treadle 18*a/b* with the vertical gravity vector of scooter 50 and thus compensate for any shift from a vertical path when depressed by the heel of a rider or when pulled upward by the operation of linking means 12.

The pair of treadles 18*a/b* are each connected at their back ends via stirrup-like springs 60 to one of a corresponding end 12*a* of a pair of linking means, such as V-belt 12, to reduce vibration. Each V-belt 12 is looped over each one of a corresponding pair of weight-vector wheels 14 mounted on the rear, vertical chassis section 41 of scooter 50. Weight-vector wheels 14 transfer the force generated by the body weight of a rider to a pair of corresponding over-running clutch drives 10 mounted on either side of and on the same axle 21 as rear-drive wheel 30 so as to provide forward thrust when foot pressure is alternately applied to each of treadles 18*a/b*.

Each other end 62 of each V-belt 12 is connected to each of a corresponding pair of return springs 22. The forward end of each of the pair of return springs 22 is fixedly connected to a cross-rod 63 mounted on chassis 13. Stopper rings 64 are fixedly mounted on each end 62 of each V-belt 12 to prevent return springs 22 from becoming over-extended when tension is applied to them by action of V-belts 12. Return springs 22 are of a predetermined length as needed to maintain the tautness of each V-belt 12 and serve to reverse the direction of force in a cycle of operation of scooter 50.

Scooter 50 is provided with a set of handlebars 34 mounted on an upright shaft 38 disposed just forward of treadles 18*a/b* for support of a rider while operating scooter 50 in an upright position and to control steering. A first T-bar 39 fixedly mounted to front steering shaft 66 is connected by a pair of cables 70 attached at their other ends to a second T-bar 72 fixedly connected to the mid-section of shaft 38. When shaft 38 is turned in the right or left direction, cables 70 move cross-bar 39 in a like direction which rotates front steering shaft 66 in the same manner to control the direction of motion for front steering wheel 32. Cables 70 absorb road shocks and reduce steering vibration. The front steering shaft 66 is fitted with a pair of springs 74 to also reduce road shock and vibration.

Figure 2B:
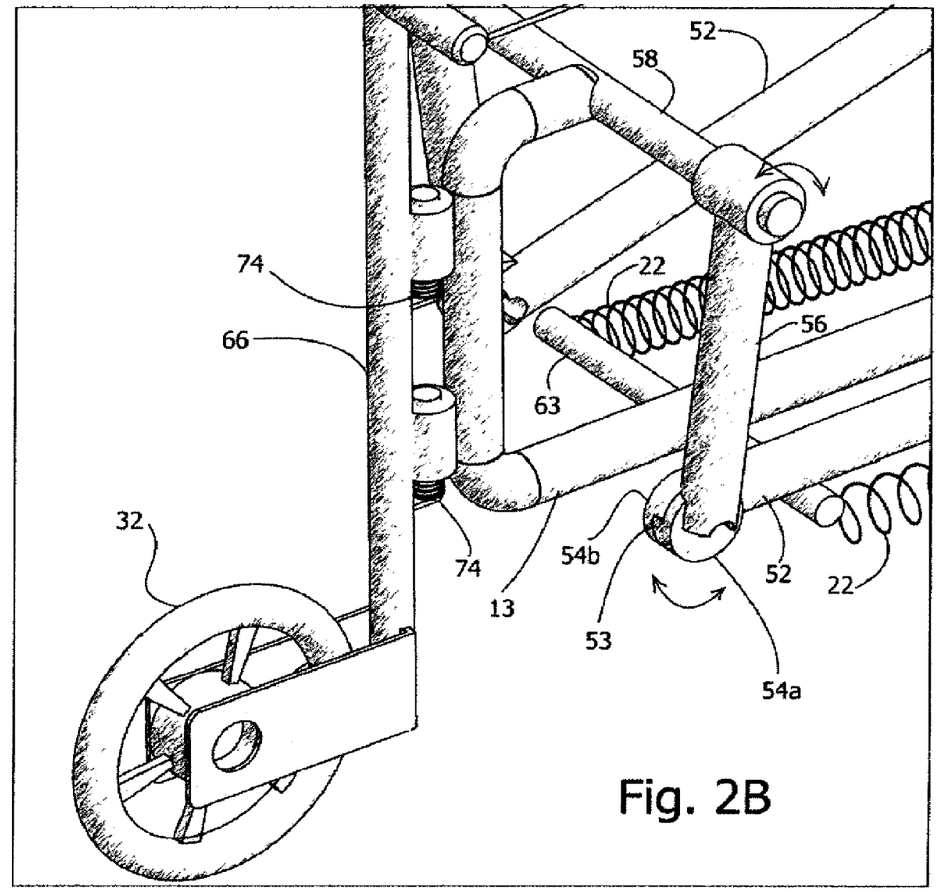
FIG. 2B is an enlarged, detailed view of a front portion of the invention from FIG. 2A.

FIG. 2B is an enlarged, detailed view of a front portion of the invention of FIG. 2A.

Each pivotable connector 54 is constructed of two, interlocking disk-like sides 54*a* and 54*b* joined together about a common axis allowing each side to pivot independently of one another within a radial plane. A predetermined gap 53 is formed between the interlocking sides which limits their rotation to a few degrees of arc as is necessary to maintain the pair of treadles 18*a/b* in vertical alignment with the gravity line and to allow the reciprocal motion of the elongated reciprocating rods 52. The other side of each of the connectors is pivotably attached to respective lower ends of corresponding extension rods each rotatably connected at their upper ends to a cross-bar 58 fixedly attached to a front section of chassis 13. Note also that the pair of return springs 22 are each fixedly attached to a corresponding end of cross-bar 63 fixedly attached to a forward section of chassis 13.

Connector 54 comprises two, disk-like sides 54*a* and 54*b* with a slight gap 53 formed between them so that sides 54*a/b* do not pivot more than a few degrees of arc (see FIG. 3). This assures that the reciprocating rods 52, which support treadles 18*a/b*, move in a manner so as to reduce any deviation of the pivoting movement of treadles 18*a/b* in their up and down motion when activated. This maintains linking means 12 in a substantially vertical alignment with the heelward portion of treadles 18*a/b*. The pair of linking means 12 is thus maintained in vertical alignment with a gravity vector to maximize the efficiency and power of the scooter in accordance with the principles of the present invention.

Figure 2C:
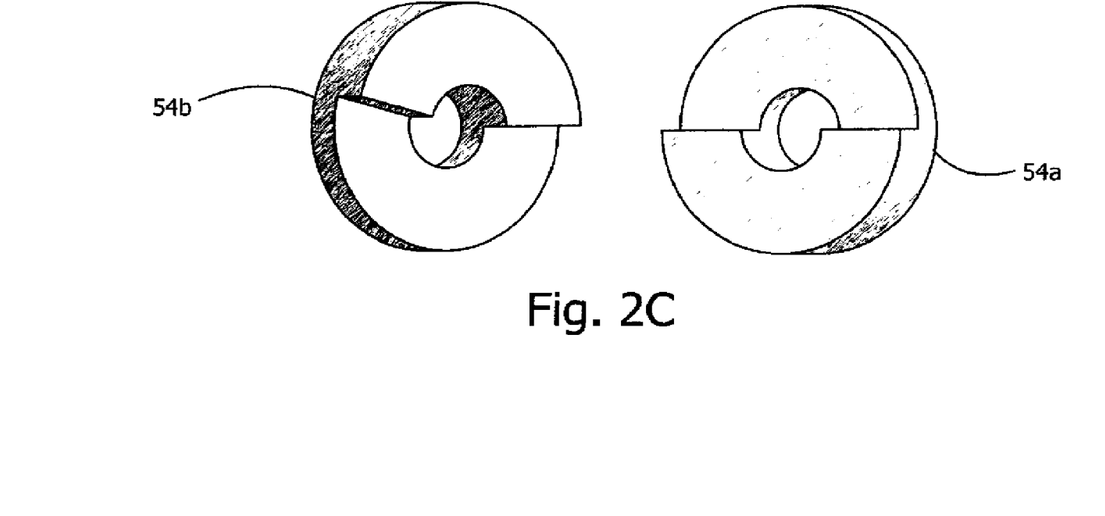
FIGS. 2C-E are detailed views of a typical pivotable connector from FIG. 2A.
Figure 2D:
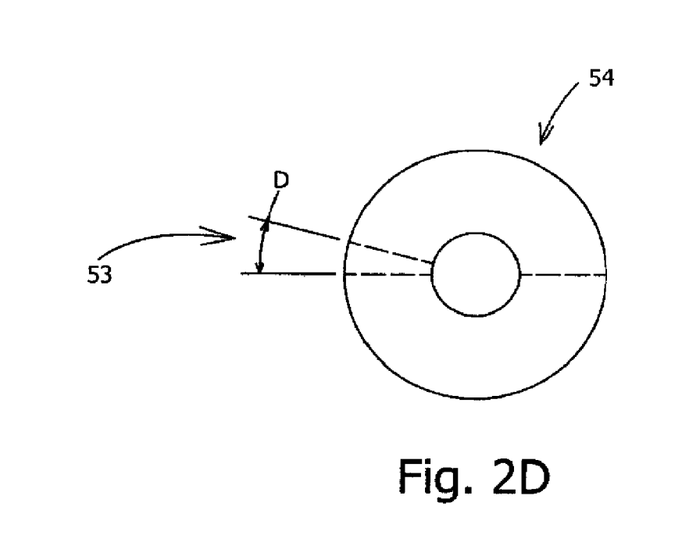
Figure 2E:
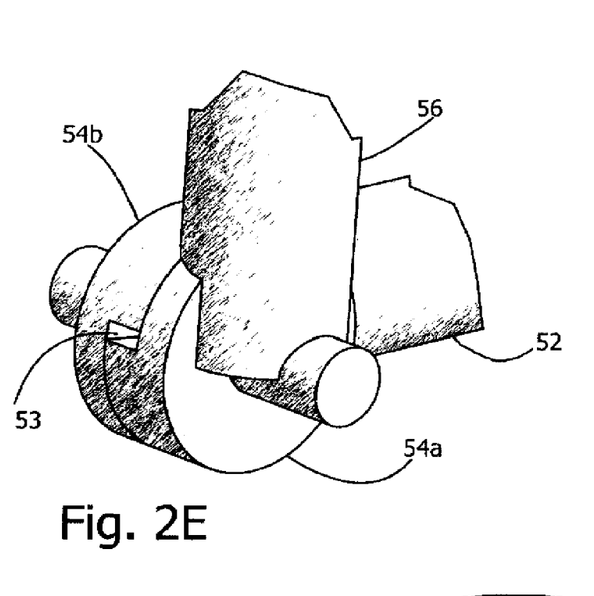

FIGS. 2C-E are detailed views of a typical pivotable connector from FIG. 2A.

In FIG. 2C there is shown a detailed view of two, inside faces of each side 54a and 54b of a connector 54. Note that side 54a is formed having half of a raised section on its inside face while side 54b is formed with a smaller raised section; the two raised sections interlocking when the two, inside faces are joined about a common axis as in FIG. 2D defining a small gap 53 between the sections 54a/b for limiting pivoting movement between them. Gap 53 is defined as angle D which varies in angular size in accordance with the amount of movement when the two sides 54a/b pivot.

FIG. 2E is an enlarged, detailed view of the ends of an extension arm 56 and a reciprocating rod 52 pivotably attached to the respective sides 54a/b so as to leave a gap 53.

FIG. 3 is a schematic diagram showing the mechanics involved in the reciprocal motion of the treadles of FIG. 2A in accordance with the principles of the present invention. For simplification, and by way of example, reference is made to only one of a pair of elements of scooter 50 (see FIG. 2A), but it is intended to also describe the other one.

Referring now to FIG. 3 in detail, there is shown a treadle 18 fixedly mounted to reciprocating rod 52, which supports it. When treadle 18 is depressed due to body-weight pressure, as indicated by the heavy downward arrow, a forward end of reciprocating rod 52 moves slightly more forward while pivoting upward together with connector 54 while simultaneously, at its rearward end, remaining in alignment with a vertical gravity line 12a which advantageously corresponds with the vertical movement of V-belt 12 between the heelward end of treadle 18 and a weight vector wheel 14 disposed above and slightly behind it. This combination of movements acts in the same vertical plane as the pressure vector on the rear, vertical section of the chassis, counteracting any shift of the heelward end of treadle 18 from the vertical gravity line 12a, thus preserving the force and efficiency of the scooter. It provides a method for compensating for the natural tendency of a flexible linking means, such as V-belt 12 to move in the path forming an arc 12b between an upper weight-vector wheel 14 and a lower over-running clutch device 10.

The middle dashed lines in FIG. 3 indicate the approximate position of reciprocating rod 52 at an intermediate stage of operation of scooter 50. Note that the movement of reciprocating rod 52 also causes the displacement of connector 54 and a corresponding displacement of extension arm 56. Extension arm 56 is rotatably connected at one end to a supporting cross-bar 58 (seen on end) disposed at an elevated position on a chassis (not shown), and connected at its other end to pivotable connector 54.

A further displacement takes place as treadle 18 is depressed to the lowest position on scooter 50 (as indicated by the bottom dashed lines in FIG. 3), coming to rest at fork-like frame 40 just in front of over-running clutch drive 10. The movement of extension arm 56 in relation to reciprocating rod 52 forms an angle C, which, as treadle 18 depresses reciprocating rod 52, adjusts to form angle B. The amount D of gap 53 (see FIG. 2D) depends on the difference between the angles which is expressed as B−C=D.

Having described the invention with regard to certain specific embodiments, it is to be understood that the description is not meant as a limitation, since further modifications may now suggest themselves to those skilled in the art, and it is intended to cover such modifications as fall within the scope of the appended claims.

I claim:

1. A body weight-activated scooter having a chassis with at least one front wheel for steering mounted on a front axle disposed in a forward chassis section, and at least one rear drive-wheel mounted on a rear axle disposed in a rear, vertical chassis section, said scooter being provided with a pair of systems substantially in alignment with a vertical gravity line for transferring power to said at least one rear drive-wheel, each of said pair of systems comprising:

a treadle having a forward and heelward end bearing most of the weight of a rider at said heelward end, being pivotally attached at said forward end to said forward chassis section;

a weight-vector wheel mounted above and behind said heelward end;

a linking means having one end pivotally attached to said heelward end and being looped over said weight-vector wheel;

a return tension means attached at one end to said forward chassis section, and attached at its other end to the other end of said linking means; and an over-running clutch drive mounted on said rear axle and mechanically connected to said at least one rear drive-wheel and linked to said weight-vector wheel via said looped linking means, said overrunning clutch drive providing sustained forward thrust when said treadle is depressed by the weight of a rider on said heelward end and said scooter is operated.

2. The scooter of claim 1 wherein said pair of systems each operates in an independent path in one plane disposed on said vertical chassis section to eliminate any power shift or significant power loss to said pair of systems due to side forces.

3. The scooter of claim 1 wherein said vertical chassis section is aligned with said vertical gravity line bearing most of the weight of a rider, freeing the remainder of said chassis from any weight-bearing load.

4. The scooter of claim 1 wherein said treadle is supported by one end of a reciprocating rod fixedly connected thereto and whose other end is pivotably attached to a connector provided to shift the major part of the weight of a rider to said heelward end so that the load upon said front axle is insignificant.

5. The scooter of claim 4 wherein said connector is pivotably attached to one end of an extension arm rotatably attached at another end to a supporting cross-bar disposed at an elevated position in said forward chassis section, said reciprocating rod, said connector, and said extension arm operate cooperatively when said treadle is depressed to direct the movement of said heelward end in a substantially downward, vertical path in alignment with said vertical gravity line to compensate for any shift of said heelward end from said vertical gravity line.

6. The scooter of claim 4 wherein said connector comprises two, interlocking disk-like sides joined together about a common axis allowing each to pivot independently of the other.

7. The scooter of claim 6 wherein said connector pivots to a predetermined degree of arc in tandem with the amount of said shift from said vertical gravity line of said heelward end.

8. The scooter of claim 6 wherein said disk-like sides are formed with inner faces so as to define a gap limiting the pivoting movement therebetween.

9. The scooter of claim 1 further comprising a steering means provided for said at least one front wheel.

10. The scooter of claim 9 wherein said steering means comprises handlebars mounted on a supporting shaft mechanically connected to said at least one front wheel.

11. The scooter of claim 9 wherein said steering means comprises handlebars mounted on a first shaft mounted on said chassis proximate to said pair of treadles and mechanically connected to a second shaft mounted on a forward portion of said chassis proximate to said at least one front wheel and connected by cables between said first and said second shaft so as to operate in tandem to control the direction of travel of said at least one front wheel.

12. The scooter of claim 1 wherein said pair of linking means comprises V-belts.

13. The scooter of claim 1 wherein said pair of linking means comprises link-chains.

14. The scooter of claim 1 wherein said forward motion is produced by generating a drive pulse transmitted to said at least one rear-drive wheel via said linking means when an incremental lifting of the heel of a rider standing on said treadle exerts foot pressure on said linking means.

15. The scooter of claim 14 wherein said forward motion is optimized when said foot pressure is applied at an extreme rear point on said treadle in line with said vertical gravity line so as to maximize the weight vector exerted on said linking means and to create forward thrust which is transferred to said at least one rear drive wheel.

16. The scooter of claim 1 wherein said return tension means comprises a return spring.

17. The scooter of claim 1 wherein said scooter is constructed of a lightweight material selected from the group comprising: plastic, aluminum, and leather.

* * * * *